United States Patent [19]
Bruce et al.

[11] Patent Number: 6,157,765
[45] Date of Patent: Dec. 5, 2000

[54] PLANAR WAVEGUIDE OPTICAL AMPLIFIER

[75] Inventors: Allan James Bruce, Westfield; Joseph Shmulovich, Murray Hill, both of N.J.

[73] Assignee: Lucent Technologies, Murray Hill, N.J.

[21] Appl. No.: 09/184,908

[22] Filed: Nov. 3, 1998

[51] Int. Cl.[7] ............................................. G02B 6/10
[52] U.S. Cl. .......................... 385/129; 385/14; 385/123; 385/126; 385/129; 385/130; 385/131; 385/142; 372/6
[58] Field of Search .............................. 385/14, 141, 142, 385/143, 144, 123, 124, 125, 126, 129, 130, 131; 372/6

[56] References Cited

U.S. PATENT DOCUMENTS 5,119,460   6/1992   Bruce et al. .
5,563,979  10/1996   Bruce et al. .

Primary Examiner—Cassandra Spyrou
Assistant Examiner—Craig Curtis
Attorney, Agent, or Firm—Mathews, Collins, Shepherd & Gould, P.A.

[57] ABSTRACT

An improved waveguide optical amplifier having an optically transparent first cladding layer, an optically transparent film doped with an optically active material, disposed over the first cladding layer, at least one undoped optically transparent film disposed over the doped film and coating etched walls of the doped film, and an optically transparent second cladding layer disposed over the undoped film. At least a portion of the undoped film disposed immediately adjacent the doped film has an index of refraction which is closer to the index of refraction of the doped film, than to the index of refraction of the second cladding layer and preferably equal thereto. The undoped film covers surface imperfections in the etched walls of the doped film, effectively moving them from the doped film/undoped film interface to the undoped film/cladding layer interface thereby reducing scattering of the high-intensity mode field. This structure also has an advantage of concentrating the active material in the high intensity areas of the mode without affecting the mode size.

14 Claims, 4 Drawing Sheets

PLANAR WAVEGUIDE OPTICAL AMPLIFIER

FIELD OF THE INVENTION

This invention relates to active optical devices, such as amplifiers, that operate by stimulated emission, and in particular, to a planar waveguide optical amplifier having reduced light scattering properties.

BACKGROUND OF THE INVENTION

Optical amplifiers are essential in optical communication networks for boosting optical signals weakened by propagation losses, splitting and filtering. There are two main types of optical amplifiers, fiber optical amplifiers and planar waveguide optical amplifiers. Fiber amplifiers are optical glass fibers having cores doped with optically active elements like rare earth elements such as erbium. Waveguide amplifiers are planar waveguides fabricated on suitable substrates such as silicon. The planar waveguide amplifiers include cores doped with optically active elements.

Fiber amplifiers are usually favored over waveguide amplifiers in most applications because waveguide amplifiers are typically much shorter, requiring a correspondingly higher level of doping to achieve the necessary gain of fiber amplifiers. Higher levels of doping adversely affect the efficiency of the amplifier. However, waveguide amplifiers are easier to manufacture than fiber amplifiers because large numbers of them can be fabricated on a single wafer and integrated on the same chip with other components making the whole unit less expensive. Therefore, in applications requiring relatively small components, device integration and ease of packaging, it is advantageous to use waveguide amplifiers.

It would be beneficial for waveguide amplifiers to have a high index of refraction contrast between the core and cladding of the waveguide to enable mode confinement, and a relatively small waveguide core cross-section for reduced power density to achieve inversion. Unfortunately, the light scattering at the core/cladding interface increases considerably with index contrast and therefore, degrades the performance of the amplifier.

Accordingly, a need exists for an improved waveguide optical amplifier that significantly overcomes the problem of light scattering.

SUMMARY

An improved waveguide optical amplifier comprises an optically transparent first cladding layer, an optically transparent film doped with an optically active material, disposed over the first cladding layer, at least one undoped optically transparent film disposed over the doped film and coating etched walls of the doped film, and an optically transparent second cladding layer disposed over the undoped film. At least a portion of the undoped film disposed immediately adjacent the doped film has an index of refraction which is closer to the index of refraction of the doped film, than to the index of refraction of the second cladding layer and preferably equal thereto. The undoped film covers surface imperfections in the etched walls of the doped film, effectively moving them from the doped film/undoped film interface to the undoped film/cladding layer interface thereby reducing scattering of the high-intensity mode field. This structure also has an advantage of concentrating the active material in the high intensity areas of the mode without affecting the mode size.

BRIEF DESCRIPTION OF THE DRAWINGS

The advantages nature and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

Figure 1:
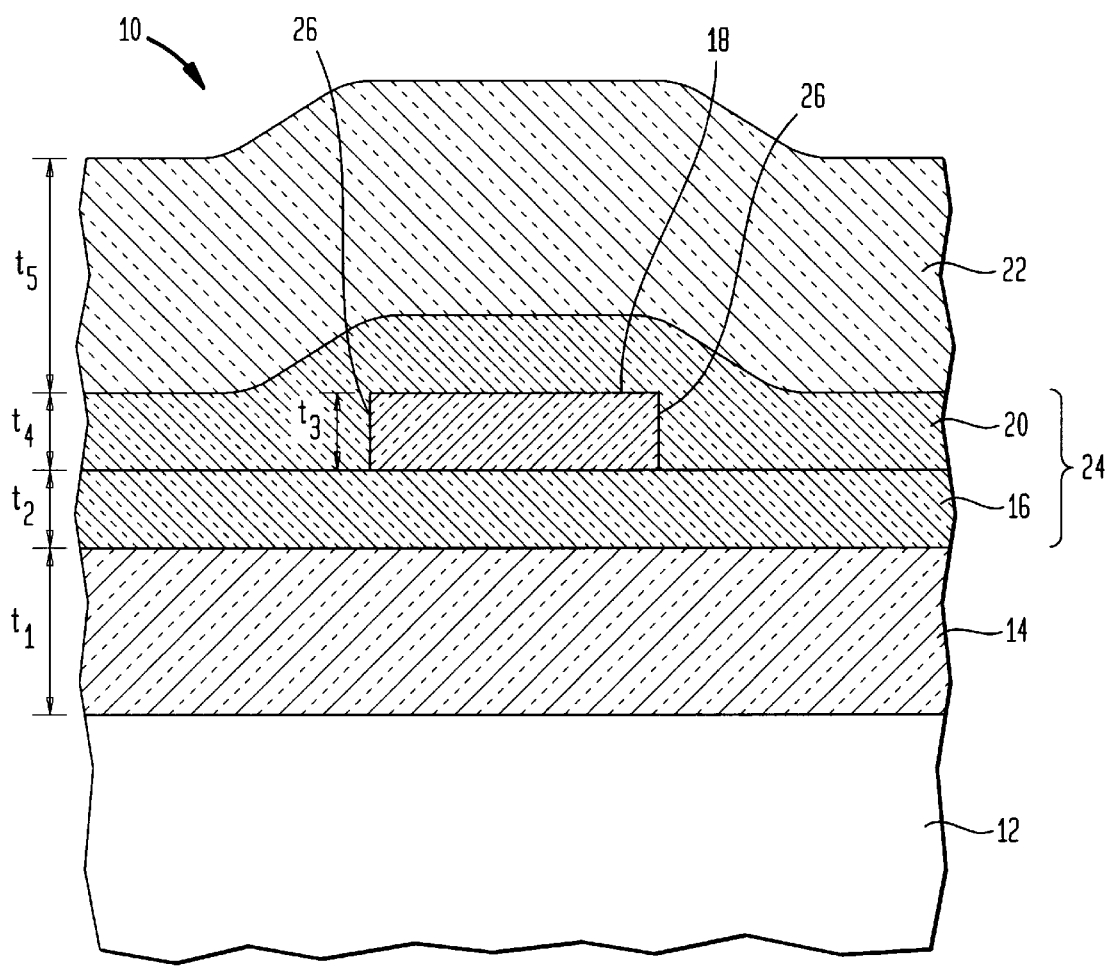
FIG. 1 is a schematic, sectional end view of a waveguide optical amplifier according to an embodiment of the present invention.

FIG. 1 shows a single or multimode waveguide optical amplifier 10 according to an embodiment of the present invention. The amplifier 10 comprises a substrate 12, a lower cladding layer 14 having a thickness $t_1$ and an index of refraction $n_1$ overlying the substrate 12, an undoped lower cover film 16 having a thickness $t_2$ and an index of refraction $n_2$ overlying the lower cladding layer 14, a patterned doped film 18 having a thickness $t_3$ and an index of refraction $n_3$ overlying the lower cover film 16, an undoped upper cover film 20 having a thickness $t_4$ and an index of refraction $n_4$ overlying the doped film 18 and the lower cover film 16, and an upper cladding layer 22 having a thickness $t_5$ and an index of refraction $n_5$ overlying the upper cover film 20. The doped film 18 has a channel-like, structure which together with the cover films 16, 20, form a "ridge" waveguide structure 24 between the lower and upper cladding layers 14, 22. By changing the geometry of the cover films 16, 20, the mode overlap can be effected with the doped film 18 of the ridge.

The lower cladding layer 14 is formed on an appropriately prepared, substantially planar principal surface of the substrate 12, which typically comprises a silicon wafer. The lower cladding layer 14 can comprise a silicon dioxide layer grown by thermal oxidation of silicon under high pressure steam (HIPOX) using conventional known methods. The thickness $t_1$ of the lower cladding layer 14 is typically greater than about 10 μm and preferably about 15 μm, in order to prevent optical leakage. The index $n_1$ of the lower cladding layer 14 is lower than the indexes $n_2$, $n_3$, $n_4$ of the films 16, 18, 20.

The upper cladding layer 22 is formed on the upper cover film 20 using conventional methods, such as low-pressure chemical vapor deposition (LPCVD). The upper cladding layer 22 typically comprises a boron-phosphorous doped silicon. The thickness $t_5$ of the upper cladding layer 22 is typically about 15 μm. The index $n_5$ of the upper cladding layer 22 is lower than the indexes $n_2$, $n_3$, $n_4$ of the films 16, 18, 20.

The undoped lower cover film 16 is formed on the lower cladding layer 14 using conventional methods such as sputtering. The lower cover film 16 can be made from alumina-silicate glass. Alumina-silicate glass films are described in U.S. Pat. Nos. 5,119,460 and 5,563,979 both issued to Bruce et al. and incorporated herein by reference.

The doped film 18 is formed on the lower cover film 16 using conventional methods such as sputtering. The doped film 18 can also made from alumina-silicate glass. The doped film 18 has a relatively high concentration of an activator such as erbium. The doped film 18 is formed into the channel-like structure by etching away side portions of the doped film 18 to form side walls 26 using a suitable etching process such as ion milling.

The undoped upper cover film 20 is formed on both the doped film 18 and the undoped lower cover film 16. The upper cover film can be made using the same methods and material described with respect to the undoped lower cover film 16, depending upon the properties of the film such as its coefficient of thermal expansion and glass transition temperature.

The thickness $t_2$, $t_3$, $t_4$ of the films 16, 18, 20 are function of the waveguide design and properties, especially the index of the material used for the films. Films 16, 18, 20 made from alumina-silicate are typically deposited so that their thickness $t_2$, $t_3$, $t_4$ are approximately the same, at about 0.5 $\mu$m per film.

The refractive indexes $n_2$, $n_4$ of the lower and upper cover films 16, 20 are selected to be about the same and preferably equal to the index $n_3$ of the doped film 18. It should be understood, however, that in other embodiments of the amplifier, the upper cover film 20 can have a graded index of refraction. The index grading provides an index of refraction at the upper cover film 20/doped film 18 interface that is about the same and preferably equal to the index of the doped film 18, this index gradually changing to about the index of refraction of the upper cladding layer 22 at the upper cover film 20/upper clading layer 22 interface.

The lower and upper cover films 16, 20 of the amplifier of the present invention provide many advantages. The lower cover film 16 permits the mode to be selectively positioned within the ridge structure 24. The upper cover film 20 provides roughness control because it covers the surface imperfections in the etched side walls 26 of the doped film 18, effectively moving them from the doped film 18/upper cover film 20 interface to the upper cover film 20/upper cladding layer 22 interface. This advantageously reduces or eliminates scattering of the high-intensity portion of the mode field (centered for example in the doped film core 18) at the doped film 18/upper cover film 20 interface. Furthermore, the upper cover film 20 can have a lower glass transition temperature than the films 16 and 18 therefore, allowing reflow at lower temperatures without affecting the doped film 18. Additionally, because the upper cover film 20 is substantially thicker than the surface imperfections, the surface imperfections at the upper cover film 20/upper cladding 22 interface are smoother and less severe in terms of their geometrical sharpness. Accordingly, the weak or low-intensity mode field at the upper cover film 20/upper cladding layer 22 interface is scattered less.

Because light scattering is significantly reduced and relocated to the cover film/cladding layer interface, the activator can be selectively placed where it is required in the waveguide 24, i.e., where the mode field is determined to be of the highest intensity. In the amplifier of FIG. 1, the high-intensity mode is in the area of the doped film 18. Amplifiers exhibiting high-intensity modes in other locations of the waveguide structure can be easily achieved by placing the activator in the location of these modes.

Figure 2:
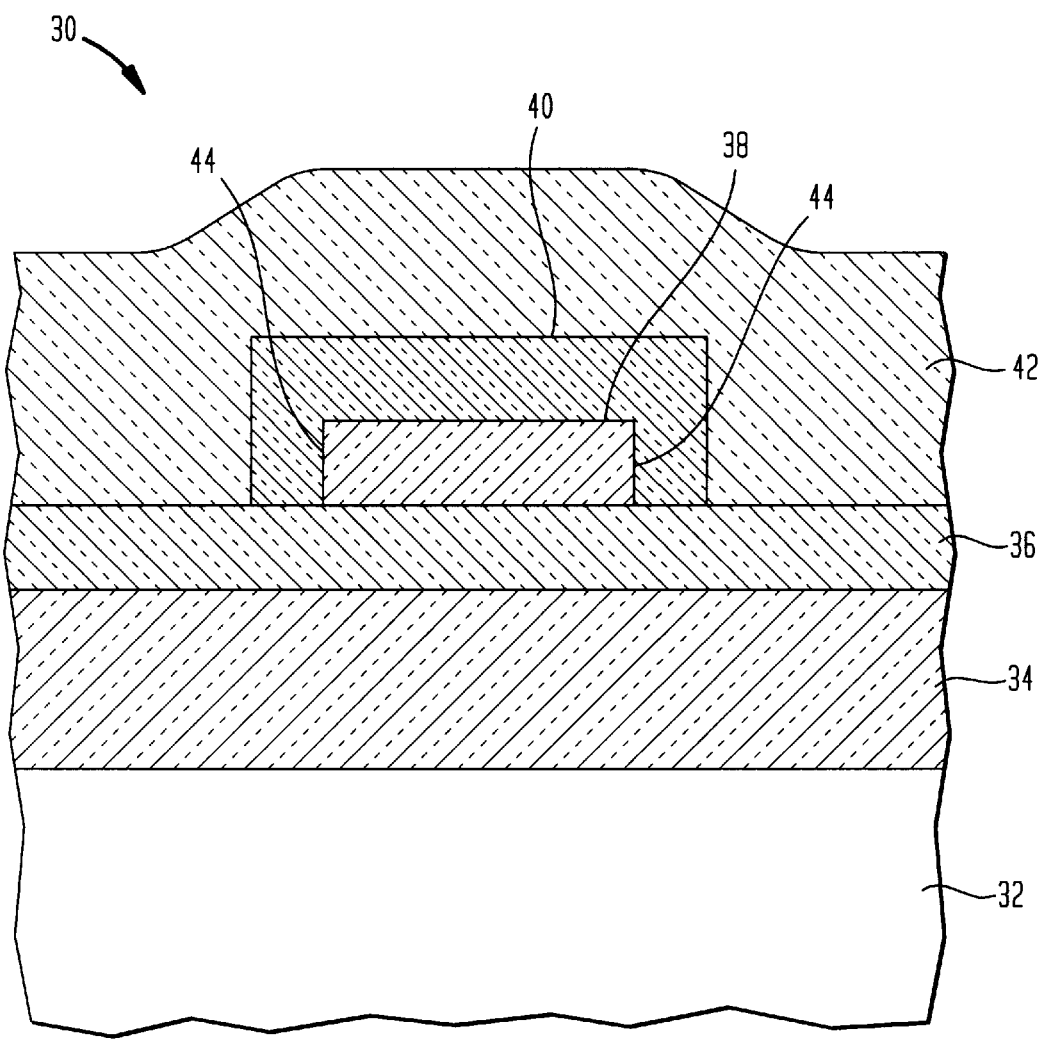
FIG. 2 is a schematic, sectional end view of a waveguide optical amplifier according to a second embodiment of the present invention.

FIG. 2 shows a waveguide optical amplifier 30 according to a second embodiment of the present invention. The amplifier 30 comprises a substrate 32, a lower cladding layer 34 overlying the substrate 32, a lower cover film 36 overlying the lower cladding layer 34, a patterned doped film 38 overlying the lower cover film 36, a patterned undoped upper cover film 40 surrounding the patterned doped film 38, and an upper cladding layer 42 surrounding the patterned undoped upper cover film 40 and overlying the lower undoped cover film 36. As in the amplifier of FIG. 1, the patterned undoped upper cover film 40 covers the surface imperfections in the etched side walls 44 of the patterned doped film 38, effectively moving them from the doped film 38/upper cover film 40 interface to the upper cover film 40/upper cladding layer 42 interface.

Figure 3:
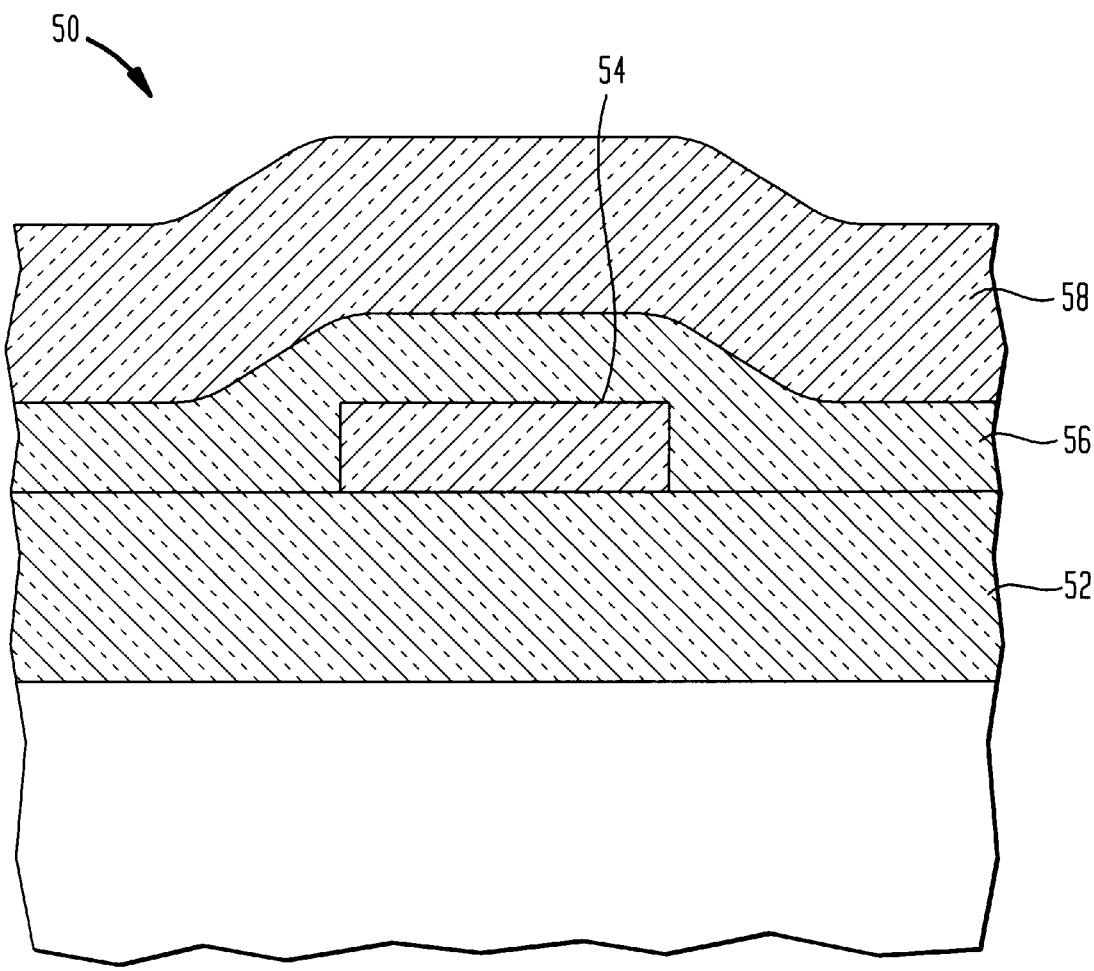
FIG. 3 is a schematic, sectional end view of a waveguide optical amplifier according to a third embodiment of the present invention.

FIG. 3 shows an amplifier 50 according to a third embodiment of the present invention. The amplifier 50 is substantially identical to the amplifier shown in FIG. 1 except that it does not include an undoped lower cover film. Accordingly, the amplifier 50 comprises a doped film 54 overlying a lower cladding layer 52 and an upper cover film 56 overlying the doped film 54 and the lower cladding layer 52. An upper cladding layer 58 overlies the upper cover film 56.

Figure 4:
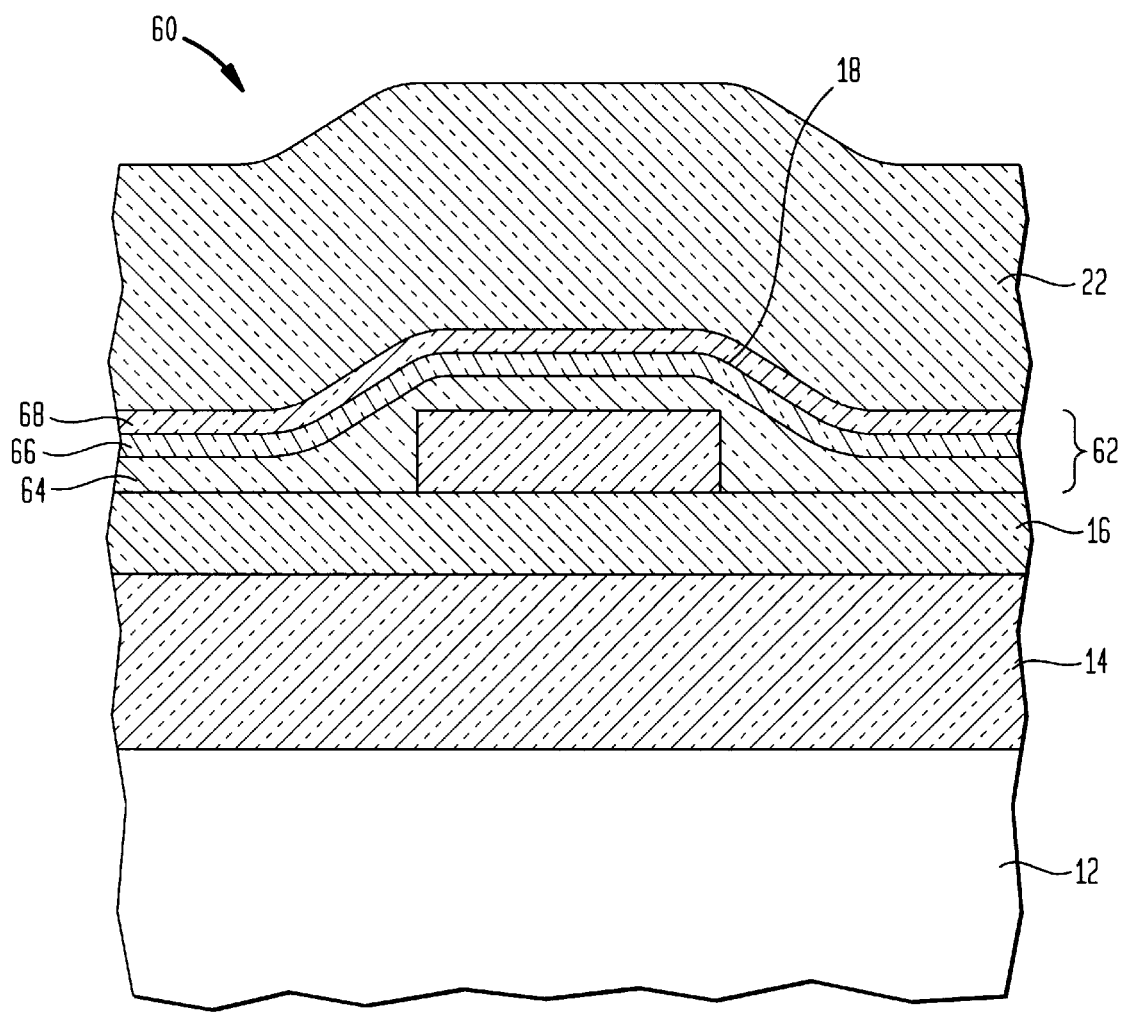
FIG. 4 is a schematic, sectional end view of a waveguide optical amplifier according to a fourth embodiment of the present invention.

FIG. 4 shows an amplifier 60 according to a fourth embodiment of the present invention. The amplifier 60 is substantially identical to the amplifier shown in FIG. except that it comprises an undoped upper cover film 62 made up of a plurality of individual undoped films 64, 66, 68 of slightly varying indices of refraction which provide the upper cover film 62 with a stepped index. In particular, the undoped film 64 (the film immediately overlying the doped film 18) has an index of refraction that is about the same and preferably equal to the index of the doped film 18. The intermediate undoped film 66 has an index of refraction which is slightly less than the index of the undoped film 64. The undoped film 68 (the film immediately beneath the upper cladding layer 22) has an index of refraction which is slightly less than the index of the undoped film 66 and similar to the index of refraction of the upper cladding layer 22.

While the foregoing invention has been described with reference to the above embodiments, various modifications and changes may be made without departing from the spirit of the present invention. Accordingly, modifications and changes such as those suggested above but not limited thereto are considered to be within the scope of the claims.

What is claimed is:

1. An optical device comprising:

an optically transparent first cladding layer of a predetermined index of refraction;

an optically transparent film doped with an optically active material, disposed over the first cladding layer, the doped film being of a predetermined index of refraction and having etched walls, the index of refraction of the doped film being greater than the index of refraction of the first cladding layer;

at least one undoped optically transparent film disposed over the doped film and coating the etched walls of the doped film; and an optically transparent second cladding layer disposed over the at least one undoped film, the second cladding layer having a predetermined index of refraction which is less than the index of refraction of the doped film;

wherein at least a portion of the undoped film disposed immediately adjacent the doped film has an index of refraction which is closer to the index of refraction of the doped film than to the index of refraction of the second cladding layer.

2. The optical device according to claim 1, wherein the portion of the undoped film disposed immediately adjacent the doped film has index of refraction which is substantially equal to the index of refraction of the doped film.

3. The optical device according to claim 1, further comprising an undoped optically transparent film disposed between the doped film and the first cladding layer.

4. The optical device according to claim 3, wherein the undoped film disposed between the doped film and the first cladding layer has an index of the refraction which is closer to the index of refraction of the doped film, than to the index of refraction of the first cladding layer.

5. The optical device according to claim 3, wherein the undoped film disposed between the doped film and the first cladding layer has an index of the refraction which is substantially equal to the index of refraction of the doped film.

6. The optical device according to claim 1, wherein the at least one undoped film disposed over the doped film has etched walls.

7. The optical device according to claim 1, further comprising a substrate having a substantially planar surface, wherein the first cladding layer is disposed over the surface of the substrate.

8. The optical device according to claim 1, wherein the at least one undoped film has a graded index of refraction.

9. The optical device according to claim 1, wherein the at least one undoped film comprises a plurality of undoped films, the undoped film disposed immediately adjacent to the doped film comprising the portion of the undoped film having the index of refraction which is closer to the index of refraction of the doped film, than to the index of refraction of the second cladding layer.

10. The optical device according to claim 9, wherein the other undoped films have indices of refraction which progressively decrease in value as a function of the undoped film's distance from the doped film thereby producing a stepped index.

11. The optical device according to claim 2, wherein the at least one undoped film comprises a plurality of undoped films, the undoped film disposed immediately adjacent to the doped film comprising the portion of the undoped film having the index of refraction which is substantially equal to the index of refraction of the doped film.

12. The optical device according to claim 11, wherein the other undoped films have indices of refraction which progressively decrease in value as a function of the undoped film's distance from the doped film thereby producing a stepped index.

13. The optical device according to claim 1, wherein the undoped film has an index of refraction which progressively decreases in value as a function of distance from the doped film thereby producing a graded index.

14. The optical device according to claim 2, wherein the undoped film has an index of refraction which progressively decreases in value as a function of distance from the doped film thereby producing a graded index.

* * * * *